(12) United States Patent
Bouvier et al.

(10) Patent No.: US 8,158,179 B2
(45) Date of Patent: Apr. 17, 2012

(54) METHOD AND EQUIPMENT FOR THE CONTINUOUS PRODUCTION OF AN EXPANDED FOOD PRODUCT

(75) Inventors: Jean-Marie Bouvier, Lyons (FR); Daniel Durand, Bas En Basset (FR); Gilles Maller, Saint Marcellin En Forez (FR); Anne Perenon, St Cyr Au Mont d'Or (FR)

(73) Assignee: Clextral, Firminy (FR)

( * ) Notice: Subject to any disclaimer, the term of this patent is extended or adjusted under 35 U.S.C. 154(b) by 274 days.

(21) Appl. No.: 12/527,012

(22) PCT Filed: Feb. 13, 2008

(86) PCT No.: PCT/FR2008/050231
§ 371 (c)(1),
(2), (4) Date: Dec. 15, 2009

(87) PCT Pub. No.: WO2008/104709
PCT Pub. Date: Sep. 4, 2008

(65) Prior Publication Data
US 2010/0104691 A1    Apr. 29, 2010

(30) Foreign Application Priority Data
Feb. 15, 2007 (FR) ..................... 07 53280

(51) Int. Cl.
*A23P 1/12* (2006.01)
(52) U.S. Cl. ........ 426/448; 426/449; 426/450; 426/516; 426/519; 426/523; 425/73; 425/114; 425/131.1

(58) Field of Classification Search ............. 426/94, 426/103, 516, 519, 523, 445–450; 425/73.113–73.114, 131.1
See application file for complete search history.

(56) References Cited

U.S. PATENT DOCUMENTS

| | | | | |
|---|---|---|---|---|
| 4,713,256 | A | * 12/1987 | Chaveron et al. | 426/631 |
| 4,741,916 | A |   5/1988 | Heidel et al. | |
| 4,839,193 | A |   6/1989 | Mange et al. | |
| 5,059,439 | A | * 10/1991 | Wenger et al. | 426/451 |
| 5,139,806 | A | *  8/1992 | Hauser et al. | 426/496 |
| 5,238,697 | A | *  8/1993 | Babines et al. | 426/557 |
| 5,397,587 | A |   3/1995 | Thompson et al. | |
| 5,480,673 | A |   1/1996 | Rokey | |
| 5,667,833 | A | *  9/1997 | Juengling et al. | 426/496 |
| 5,783,240 | A | *  7/1998 | Wenger et al. | 426/231 |
| 5,972,404 | A |  10/1999 | van Lengerich | |

(Continued)

FOREIGN PATENT DOCUMENTS
EP    0169106 A    1/1986
(Continued)

OTHER PUBLICATIONS

Fast et al., "Breakfast Cereals and How They are Made", Chapter 3, pp. 100-101 (1990).

(Continued)

*Primary Examiner* — Drew E Becker
(74) *Attorney, Agent, or Firm* — Connolly Bove Lodge & Hutz LLP

(57) ABSTRACT

The invention relates to a method for the continuous production of an expanded edible food product obtained by cooking-extrusion and containing solid inclusions having a size larger than 0.5 mm.

16 Claims, 2 Drawing Sheets

U.S. PATENT DOCUMENTS

| | | | |
|---|---|---|---|
| 6,479,002 B1 | 11/2002 | Becker et al. | |
| 6,582,753 B1 * | 6/2003 | Willibald-Ettle et al. | 426/660 |
| 6,743,453 B2 * | 6/2004 | Warrington et al. | 426/231 |
| 2004/0142081 A1 * | 7/2004 | Durand et al. | 426/516 |
| 2011/0290122 A1 * | 12/2011 | Asencio et al. | 99/426 |

FOREIGN PATENT DOCUMENTS

| | | |
|---|---|---|
| EP | 0169106 A1 | 1/1986 |
| EP | 0267368 A2 | 5/1988 |
| FR | 2572899 A | 5/1986 |
| FR | 2572899 A1 | 5/1986 |
| FR | 2879898 A | 6/2006 |
| FR | 2879898 A1 | 6/2006 |
| WO | WO-0040384 A1 | 7/2000 |
| WO | WO-02069744 A | 9/2002 |
| WO | WO-02069744 A1 | 9/2002 |

OTHER PUBLICATIONS

Guy, "Extrusion Cooking—Technologies and Applications", p. 145 (2001).
Mercler et al. "Extrusion Cooking", pp. 10-11 (1989).
Mercler et al., "Extrusion Cooking", pp. 98-107 (1989).
Frame, "The Technology of Extrusion Cooking", pp. 98-99 (1994).

\* cited by examiner

METHOD AND EQUIPMENT FOR THE CONTINUOUS PRODUCTION OF AN EXPANDED FOOD PRODUCT

CROSS REFERENCE TO RELATED APPLICATIONS

This application is a National Phase filing under 35 U.S.C. §371 of PCT/FR2008/050231 filed Feb. 13, 2008, which claims priority to Patent Application No. 0753280, filed in France on Feb. 15, 2007. The entire contents of each of the above-applications are incorporated herein by reference.

The present invention relates to the field of extrusion cooking of edible food products. More specifically, the present invention relates to a method for the continuous production of an expanded edible food product containing solid inclusions larger than 0.5 mm and obtained from a solid raw material partially containing carbohydrates and/or proteins.

BACKGROUND OF THE INVENTION

In the document FR-A-2 572 899, it is known to produce a food product which is either expanded or not, filled or not, such as bread, a brioche-like product or the like, from a material containing carbohydrates, using an extrusion cooking method.

In such a method, a screw of an extruding machine is driven in rotation in a cylindrical body and carries out an appropriate treatment on the raw material which comprises, in particular, at least one kneading step, one compression step and one cooking step of the raw material. The downstream end of the extrusion cylinder is provided with an extrusion die, through which the food product produced from the raw material emerges from said extruding machine.

Moreover, food products are known which are produced from carbohydrates and contain inclusions, such as pieces of nut or chocolate or other pieces. Said food products are produced by using traditional methods, in a first step of which a dough is made from various ingredients and kneaded in a vat. The inclusions are introduced into the dough during this first step, after which the dough is removed from the vat, divided up into pieces and placed in a cooking oven. A second step consists in cooking the pieces of dough in this oven.

This type of traditional method has drawbacks which principally lie in the fact that it is of long duration and consumes a high amount of energy, which is translated into an increased cost for producing the food product. Moreover, with these traditional methods, it is difficult to obtain homogenous food products due to production conditions. Moreover, said methods do not allow products with expanded and crisp textures to be produced, such as those obtained by the extrusion cooking of starch and protein-based products.

More specifically, obtaining expanded food products containing visible inclusions by means of extrusion cooking poses problems.

More specifically, to produce an expanded food product it is necessary for the product, which is extruded at the outlet of the extruding machine and which is formed by a mixture containing water, to pass from a zone, in the pressure-temperature diagram of water, where the water is in the liquid state to a zone where normal pressure and temperature conditions prevail and where the water is in the gaseous state.

The conditions prevailing inside the cylinder of the extruding machine are exacerbated by high shear rates, due to the co-penetrating and self-cleaning screws of said extruding machine, as the material has to be transformed or cooked by the application of mechanical energy. To achieve this, the composition of the screws of the extruding machine conventionally comprises high shear mixing zones, with screw elements of reverse pitch or kneading discs, which mill and considerably reduce the size of the inclusions introduced at the inlet in the region of the supply zone of the extruding machine.

Moreover, raised pressure levels also prevail inside the cylinder of the extruding machine in order to create zones which are completely filled where the transformation of the material takes place.

Finally, the construction of the extrusion dies located at the outlet of extruding machines is not generally adapted to the flow of mixtures enriched with macroscopic inclusions which may create obstructions.

As a result, the introduction of inclusions into the cylinder of the extruding machine in the region of the zone for supplying raw material causes the degradation of these inclusions as they are subjected to excessive crushing. Thus, the presence of these inclusions in the final product is not visible and said inclusions are degraded.

To resolve this problem, the person skilled in the art naturally considers introducing inclusions into a zone located downstream of the supply zone relative to the direction of flow of material in this extruding machine. However, this does not resolve the problem as the inclusions also have to be introduced into the cylinder at low pressure and at low shear, to avoid the mechanical crushing thereof.

Moreover, in the extruding machine, the worked product is cooked and brought to a temperature which is equal to, or slightly greater than, 100° C. If the inclusions are introduced into this product in a zone at low pressure, the overheated water which it contains is released in the form of steam, preventing the inclusions from entering the product.

In the document FR-A 2 879 898, a method is also known for obtaining a food product from at least one material containing carbohydrates and/or proteins by means of an extruding machine having at least one screw. This product contains solid inclusions larger than 0.5 mm, introduced continuously into the material as soon as possible during the cooking of said material during a compression, kneading and cooking step.

The inclusions are introduced into the cylinder of the extruding machine using a metering device comprising a feed duct for said inclusions which discharges into said cylinder in the region of the cooking zone.

This known method has drawbacks.

More specifically, during the working and heating of the material in the cylinder of the machine, steam is produced which naturally rises into the metering device through the feed duct. This rising steam tends to moisten the inclusions before they are fed into the cylinder and tends to interfere with the regular metering of said inclusions into the material.

Moreover, given the incorporation of the inclusions in the cooking and intense mixing zone, said inclusions are subjected to relatively harsh conditions due to the shear force and they are also subjected to a raised temperature of approximately 130 to 150° C.

Taking account of these conditions and added to the fact that they are pre-moistened due to the steam, more fragile inclusions, such as cereal flakes, dried red fruits or low-fibre vegetables, dissolve and become buried in the mass of cooked material and disappear. The yield of visible inclusions in the final product is practically zero.

Inclusions which are slightly fragile, such as fibrous vegetables, are partially degraded and provide a yield of 10 to 20% of visible inclusions in the final product.

Thus, only inclusions which are very rich in fibre, such as small grains, and above all very hard inclusions, such as broken cereals, resist this degradation after their introduction into the extruding machine and provide a yield of 20 to 50% of visible inclusions in the final product. This result is acceptable but costly as it requires a relatively high consumption of inclusions to obtain a satisfactory result as regards visibility of inclusions in the product obtained.

Thus, the incorporation of inclusions in an expanded and edible food product obtained by extrusion cooking poses problems.

SUMMARY OF THE INVENTION

The object of the invention, therefore, is to overcome these problems by proposing a method for the continuous production of an edible and expanded food product, which contains solid and visible inclusions and which is made from a material containing carbohydrates and/or proteins.

To this end, the invention relates to a method for the continuous production of an expanded edible food product, containing solid inclusions larger than 0.5 mm and obtained from a solid raw material containing carbohydrates and/or proteins, characterised in that, in a cylinder of an extruding machine having at least one screw;
- during a first step the raw material is introduced with possibly at least one additive and additional water is optionally added,
- during a second step the raw material, said at least one additive and the water are mixed and said mixture is cooked to obtain a cooked dough,
- during a third step the dough is compressed, forming a sealing plug in order to keep the preceding steps under pressure and to limit leakages downstream,
- the dough is degassed in a fourth pressure-relieving step, in order to reduce the pressure downstream in the cylinder,
- the inclusions are introduced into the dough during a fifth step,
- during a sixth step the dough and the inclusions are mixed at a low shear rate to obtain a homogenous mixture with a uniform distribution of inclusions in the dough, and
- during a seventh step the dough-inclusion mixture is pushed into an extrusion die at a very low shear rate, at the outlet of which the mixture expands.

According to further advantageous features of the method:
- the raw material consists of powdered flour and/or semolina, such as wheat, maize, soya and/or gluten, and
- the additive consists, for example, of salt and/or sugar and/or vitamins and/or fibres and/or at least one colouring agent or any other component.

The invention further relates to equipment for the continuous production of an expanded and edible food product containing solid inclusions larger than 0.5 mm and obtained from a solid raw material partially containing carbohydrates and/or proteins, characterised in that it comprises an extruding machine comprising at least one screw driven in rotation inside an elongate cylinder successively defining from upstream to downstream:
- a first zone for introducing the raw material and possibly at least one additive, then for optionally adding additional water,
- a second zone for mixing the raw material, said at least one additive and water, and for cooking said mixture to obtain a cooked dough,
- a third zone for compressing the dough, forming a sealing plug to keep the preceding zones under pressure and limit steam leakages downstream,
- a fourth zone for relieving the pressure of the dough by degassing to reduce the pressure inside the cylinder downstream,
- a fifth zone for introducing inclusions into the dough,
- a sixth zone of low shear rate for the dough and inclusions to obtain a homogenous mixture with a uniform distribution of inclusions in the dough, and
- a seventh zone for the extrusion of the dough-inclusion mixture into an extrusion die of very low shear rate, with the expansion of this mixture at the outlet of said extrusion die.

BRIEF DESCRIPTION OF THE DRAWINGS

The invention will be understood more clearly by reading the following description, given by way of example and with reference to the accompanying drawings, in which.

DESCRIPTION OF THE PREFERRED EMBODIMENTS

Figure 1:
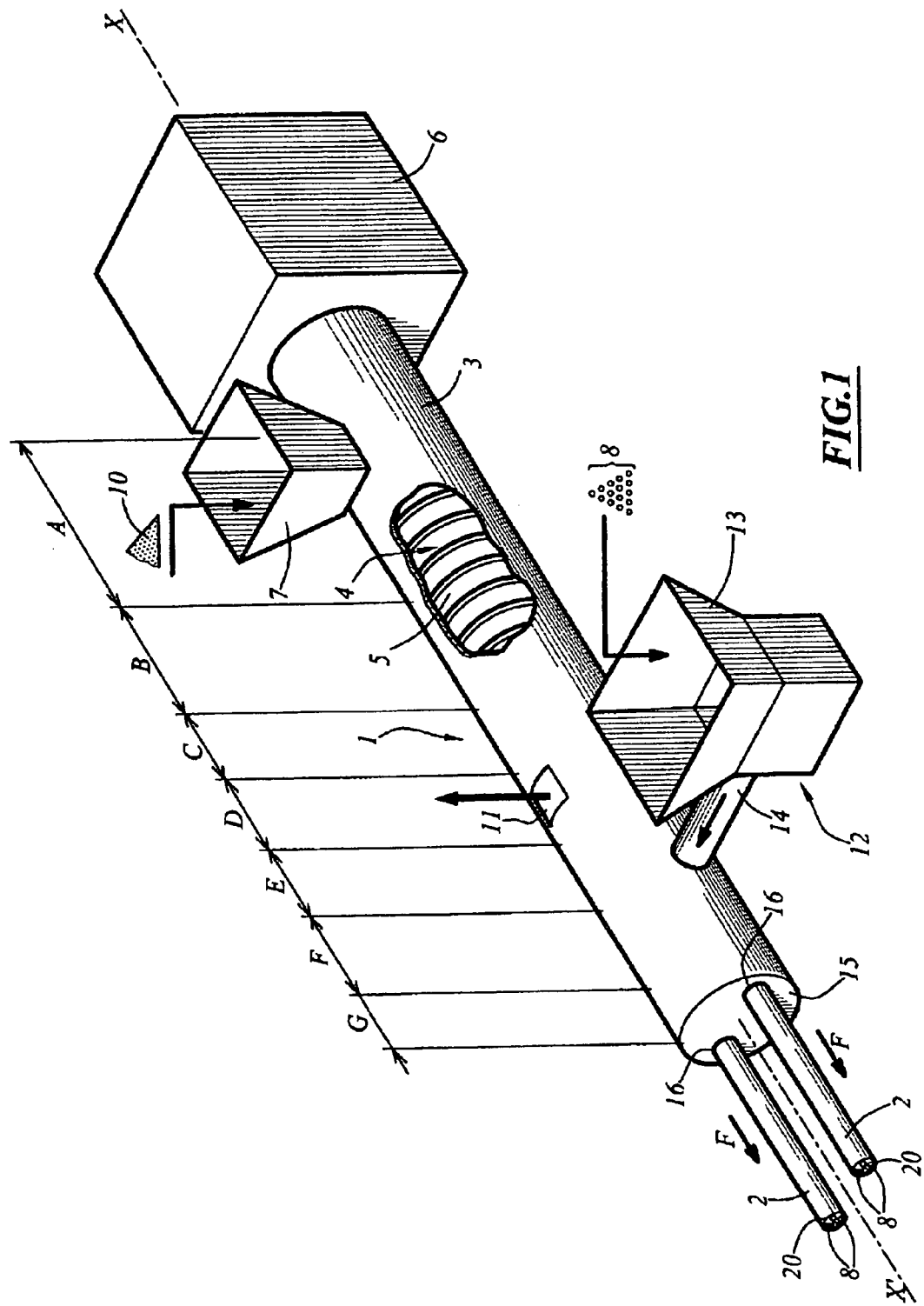
FIG. 1 is a schematic, perspective, partly cut-away view of an extruding machine for the preparation of a food product from a production method according to the invention.

In FIG. 1, the arrow F indicates the direction of progression of the material in an extruding machine which is denoted in its entirety by the reference numeral 1.

Said extruding machine 1, used for the continuous production of an expanded edible food product 2 and containing solid inclusions larger than 0.50 mm, comprises a cylinder 3 which has the shape of a hollow body and defines an elongate chamber 4.

In this chamber 4 is mounted at least one longitudinal and rotating screw 5 for treatment, compression, kneading and/or shearing and said screw 5 is coupled to means for driving in rotation 6, known per se.

According to a variant, the extruding machine 1 may be provided in the chamber 4 with two co-rotating and co-penetrating screws which are self-cleaning over at least a portion of their length.

Hereinafter, the description will be provided of an extruding machine 1 comprising a screw 5, and the terms "upstream" and "downstream" in addition to similar terms, refer to the direction of progression of the material in the extruding machine, denoted by the arrow F.

The cylinder 3 and the screw 5 define, relative to the direction of movement F of the material, a plurality of successive treatment zones. To this end, and in a manner known per se, the screw 5 is provided with a plurality of successive portions, amongst which there may be in particular one or more compression portions, one or more kneading portions, and one or more braking portions.

Depending on the portion, the screw 5 may be provided in particular with a thread of coarse pitch, a thread of fine pitch, a thread of reverse pitch or even kneading discs. The manner in which the different portions of the screw succeed one another along the axis XX' is selected according to the treatment and/or the raw material and/or the type of food product sought.

Thus, the cylinder 3 and the screw 5 determine a first zone A for introducing raw material 10 and possibly at least one additive, then for optionally adding additional water. In this zone A, the solid raw material in the form of powder is introduced and said raw material may be flours, semolinas, such as wheat, maize, soya and/or gluten. The additives also introduced into this zone A consist, for example, of salt or sugar, or consist of vitamins, fibres and/or colouring agents. Water is possibly introduced into this zone A downstream of the introduction of the raw material and additives.

According to various possibilities, a mixture containing the raw material, the additives and water may be prepared separately, and introduced at a single location into zone A of the extruding machine 1. The additives may also be included in the raw material.

The raw material contains, to a large extent, carbohydrates and/or proteins.

To permit the introduction of the raw material 10 and additives into the extruding machine 1, the cylinder 3 is provided with a feed hopper 7 of which the internal volume communicates with the chamber 4 defined inside the cylinder 3. The hopper 7 is supplied regularly or continuously with raw material 10 and additives, and an orifice, not shown, for injecting water into the chamber 4 is provided downstream of the hopper 7.

The different ingredients thus introduced into zone A of the extruding machine 1 are transferred, at the outlet of this zone A, into a second mixing and cooking zone B to obtain a cooked dough. In this second zone, the screw 5 has a forward pitch, gradually reducing from upstream to downstream of this zone B. For example, the screw 5 in the second zone B comprises kneading and/or mixing discs and/or at least one screw element of reverse pitch and the temperature of the mixture in this zone B is of approximately 140° C.

To achieve this, the cylinder 3 is provided with heating means, not shown, which are placed, for example, on the cylinder 3. They may comprise one or more annular jackets of the conventional type, not shown, placed in contact with the cylinder 3 and passed through by a coolant or by an electrical current, in which case heat is transferred by conduction in this cylinder 3 to the mixture to be cooked present in the chamber 4. As a variant, means for heating the cylinder 3 by induction may also be provided.

At the outlet of the second zone B, the cooked dough is transferred into a third zone C for compression of the dough, forming a sealing plug to keep the preceding zone B under pressure and to limit steam leakages downstream of the chamber 4. The screw 5 is provided, in this third zone C, with at least one screw element of reverse pitch, such as counter-threads or kneading discs or other appropriate elements without having a driving effect on the dough in order to keep the preceding zones under pressure by forming a plug of dough.

After this plug, the pressure inside the cylinder 3 is reduced and the pressure of the dough is reduced in a fourth zone D known as the pressure-relieving zone.

This pressure reduction is obtained using the screw 5 which has a large forward pitch and using at least one orifice 11 for exposure to air or for degassing, which is formed in the cylinder 3 and which allows the pressure to escape.

More specifically, said orifice 11 makes it possible to reduce the pressure in the chamber 4 inside the cylinder 3 in the region of said zone D and to evacuate the steam from the extruding machine 1.

After this degassing zone D, the edible and solid inclusions 8 are introduced into the chamber 4 inside the cylinder 3 by continuous injection means for said inclusions, into a fifth zone E.

The continuous injection means for the inclusions may be of any appropriate type. For example, said means consist of a metering device 12 for introducing inclusions into the chamber 4 under pressure and to this end, the metering device 12 comprises a hopper 13 connected to the cylinder 3 by a duct 14 which encloses an Archimedes screw, not shown, and guides the inclusions.

In the example shown in FIG. 1, the metering device 12 is arranged laterally relative to the cylinder 3.

Figure 2:
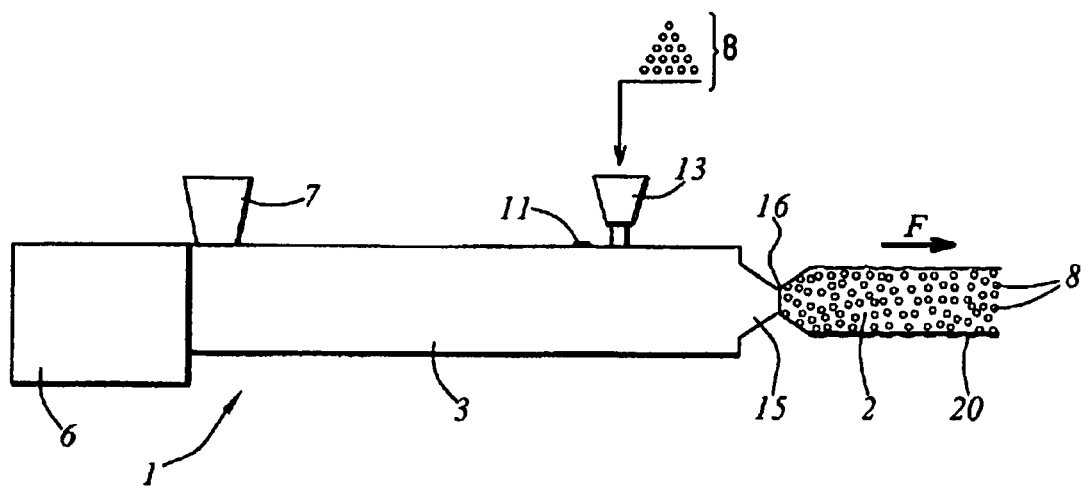
FIG. 2 is a diagrammatic and simplified side view of the extruding machine with a variant of the means for introducing the inclusions.

According to a variant, the metering device 12 may be arranged vertically above the cylinder 3, as shown in FIG. 2.

For these two possibilities for introducing inclusions 8, the pressure in the chamber 4 of the extrusion machine 1 has to be less than 10 bar.

According to yet another variant, the inclusions 8 may be introduced into the chamber 4 by gravity, through an opening to the outside air formed in the cylinder 3. In this case, the pressure in the chamber 4 in the region of the introduction of the inclusions has to be zero.

The inclusions 8 are all of the same type or different types mixed with one another. Said inclusions may be selected, in particular, from pieces of dried fruit or vegetables and/or grains which may be broken or not. Said inclusions 8 may also be selected from aromatic carriers or aromatic pieces of, for example, mint or orange, dried fruit, pieces of cheese, pieces of biscuit and/or nuts which may be broken or not, such as coconut, almond, cashew nuts, macadamia nuts and hazelnuts.

The inclusions 8 are larger than 0.5 mm and are advantageously larger than approximately 1 mm. Preferably, the inclusions 8 are smaller than 10 mm or approximately 20 mm and in some cases, may be equal to or larger than 20 mm.

The dough and the inclusions are then transferred into a sixth zone F of low shear rate to obtain a homogenous mixture with a uniform distribution of the inclusions in the dough.

In this sixth zone F, the screw profile has a shear rate which is at least twice as low as in zones C and D.

In the case of a double-screw extruding machine, the screws 5 have a reduced external diameter in this sixth zone F and said screws are co-penetrating, but not self-cleaning, with tolerances such that the inclusions 8 are neither crushed nor milled during their passage into said sixth zone F. The majority of the inclusions 8 remain at the periphery of the volume swept by the screws.

According to a variant, in this sixth zone F, the screws with a plurality of threads may have one of the threads reduced in height or completely eliminated to allow an annular passage or a large free volume, available for the circulation of the material and the inclusions 8.

According to a further variant, the screws with two threads in this sixth zone F may have a very large pitch.

Generally and surprisingly, in this sixth zone F, a mixing effect is produced without mechanical crushing and the inclusions 8 are uniformly distributed in the mass of the dough.

By way of example, the ratio in the different zones between the pitch of the thread of the screw 5 and the external diameter of this screw 5 is as follows:
zone A: the ratio is greater than 1 and preferably between 1 and 1.5,
zone B: the forward pitches are gradually reduced and the ratio reduces to a minimum of 0.3 and is preferably between 0.35 and 0.5,
zone D: the ratio is between 1 and 1.5, zone E: the ratio is between 1 and 1.5.

At the end of the sixth zone F, the pressure inside the cylinder 3 is of approximately 60 to 100 bar and the temperature of the mixture, which may reach 120° C., is nevertheless kept as close as possible to 100° C. so the inclusions remain whole.

During a seventh step G, the dough-inclusions mixture is pushed into an extrusion die 15 of very low shear rate, at the outlet of which the mixture expands.

The extrusion die 15 comprises at least one extrusion orifice 16 and preferably a plurality of orifices 16, each having a diameter at least equal to 0.5 mm.

When the mixture at the outlet of the sixth zone F penetrates the orifices 16 of the extrusion die 15, it is subjected to pressure conditions of approximately 60 to 100 bar at a temperature kept as close as possible to 100° C. so the inclusions remain whole.

In these conditions, the water contained in the mixture is in the liquid state and perfectly mixed with the starchy material 8. When the mixture emerges from the extrusion die 15, it passes suddenly from high pressure to atmospheric pressure, thus causing a significant fall in pressure which causes flash evaporation of the water contained in the material, and the steam produced generates small bubbles in this material which is still in the melted state. Said bubbles are enlarged due to the high production of steam. This production of steam simultaneously causes a fall in temperature of the product until it reaches a temperature of approximately 100° C. at the end of the expansion step.

By way of example, a food product 2 has been able to be obtained from a solid raw material containing carbohydrates and/or proteins, such as:
cornflour or cornmeal,
wheat flour,
oat flour,
rye flour,
rice flour, tapioca flour, sweet potato flour,
or a mixture of these components, enriched or not with a protein base.

The inclusions 8 are, for example:
precooked, whole or crushed cereal grains, for example wheat, maize,
nut pieces, hazelnuts, cashew nuts,
poppy seeds, sesame seeds, peppercorns, etc.,
pieces of dried fruit: apricots,
pieces of dried vegetable: carrots.

The edible food product 2 directly obtained at the outlet of the extruding machine 1 may advantageously contain 30 to 95% by weight of raw material and 5 to 70% by weight of solid inclusions 8.

The complete cycle of preparing the food product 2 using the extruding machine 1 is continuous and rapid which is translated into a reduction in the cost of producing this product 2 in accordance with the object of the invention.

The reduction in cost also results from the fact that the extruding machine 1 has a low energy consumption. Moreover, the continuous production of the food product 2 by the extruding machine 1 makes it possible to save time relative to a discontinuous method in which there is inevitably a loss of time during the transition between successive steps.

Figure 3:
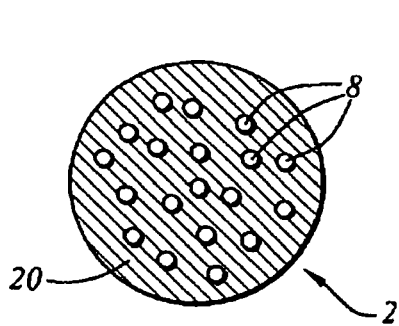
FIG. 3 is a diagrammatic view in cross section of the food product obtained using the production method according to the invention.

After the outlet of the extrusion die 15, the food product 2, directly obtained and shown in FIG. 3, comprises an edible matrix 20 which results from the transformation of the raw material by extrusion cooking and in which the inclusions 8 are buried and arranged substantially homogenously.

For example, the matrix 20 may be a product of the cracker or crisp biscuit type. More specifically, as it is obtained by extrusion cooking, the matrix 20 has an expanded and crisp texture, identical to the extruded product and containing in addition solid inclusions.

As the introduction of the inclusions 8 into the dough is continuous and controlled according to the flow rate of this dough, the distribution of the inclusions 8 along the rolls of food product 2 at the outlet of the extruding machine 1 is substantially constant, which is advantageous.

Moreover, the distribution of the inclusions 8 in the matrix 20 is substantially uniform which is also advantageous.

Figure 4:
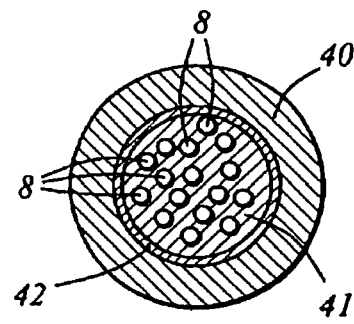
FIG. 4 is a diagrammatic view in cross section of a variant of the food product obtained by the production method according to the invention.

According to a variant shown in FIG. 4, the food product 2 comprises an external cylinder 40 which is expanded and which encloses a core 41 where the inclusions 8 are located. In this example, the inclusions 8 are buried in a edible filling which constitutes the core 41 which may, in particular, be a dough and in which the inclusions 8 may be distributed in a homogenous manner.

For example, this product may comprise an intermediate layer 42 in the form of a tubular cylinder, separating the filling 41 which contains the inclusions 8 from the casing 40.

Generally, the method according to the invention makes it possible to solve the problems of introducing and distributing the inclusions in a product obtained by an extruding machine and has advantages relative to the prior art.

The problem is thus resolved by a combination of a plurality of elements and which are:
a greater specialization of the working zones of the profile of the screws so as to separate the cooking zone B from zone E for introducing inclusions, said zone E being able to comprise a screw profile of low shear rate, i.e. of coarse pitch or modified in shape to create an annular passage or a free volume of large dimensions, and thus causing little damage to inclusions which are highly or slightly fragile, and
the incorporation in the extruding machine of a degassing zone D between zones B and E with the creation of a sealing plug in zone C between zones B and E, which makes it possible to eliminate the steam upstream of the supply of inclusions and to reduce the temperature in said supply zone to a value of approximately 100° C. which proves advantageous for the most fragile of inclusions.

Said alterations make it possible to significantly increase the yield of visible inclusions in the final product, in particular for inclusions which are highly or slightly fragile, said yield, with the method according to the invention, being between 20 and 50%, and also for the most resistant inclusions, of which the yield is 60 to 90% with this method.

The invention claimed is:

1. Method for the continuous production of an expanded edible food product (2) containing solid inclusions (8) larger than 0.5 mm and obtained from a solid raw material (10) containing carbohydrates and/or proteins, wherein in a cylinder (3) of an extruding machine (1) having at least one screw (5):
during a first step the raw material (10) is introduced with optionally at least one additive and additional water is optionally added,
during a second step, the raw material (10), said at least one additive and the water are mixed and the resulting mixture is cooked to obtain a cooked dough,
during a third step, the dough is compressed, forming a sealing plug in order to keep the preceding steps under pressure and to limit steam leakages downstream,
the dough is degassed in a fourth pressure-relieving step in order to reduce the pressure downstream in the cylinder (3), the inclusions (8) are introduced into the dough during a fifth step, during a sixth step the dough and the inclusions (8) are mixed at low shear rate to obtain a homogenous mixture with a uniform distribution of inclusions (8) in said dough, and during a seventh step the dough-inclusion mixture is pushed into an extrusion die (15) at a very low shear rate, at the outlet of which the mixture expands.

2. Method according to claim 1, wherein the raw material (10) consists of powdered flour and/or semolina.

3. Method according to claim 1, wherein said at least one additive consists, of salt and/or sugar and/or vitamins and/or fibres and/or at least one colouring agent and/or any other component.

4. Method according to claim 1, wherein the yield of visible inclusions is between 20 and 50% for the most fragile and slightly fragile inclusions and between 60 and 90% for the most resistant inclusions.

5. Equipment for the continuous production of an expanded and edible food product (2) containing solid inclusions (8) larger than 0.5 mm and obtained from a solid raw material (10) containing carbohydrates and/or proteins, wherein it comprises an extruding machine (1) comprising at least one screw (5) driven in rotation inside an elongate cylinder (3) successively defining from upstream to downstream:

a first zone A for introducing the raw material (10) and optionally at least one additive, then for optionally adding additional water, a second zone B for mixing the raw material (10), said at least one additive and water, and for cooking said mixture to obtain a cooked dough, a third zone C for compressing the dough, forming a sealing plug to keep the preceding zones under pressure and to limit steam leakages downstream, a fourth zone D for relieving the pressure of the dough by degassing to reduce the pressure inside the cylinder (3) downstream, a fifth zone E for introducing inclusions (8) into the dough, a sixth zone F of low shear rate for the dough and inclusions (8) to obtain a homogenous mixture with a uniform distribution of inclusions (8) in the dough, and a seventh zone G for the extrusion of the dough-inclusion mixture into an extrusion die (15) of very low shear rate, with the expansion of this mixture at the outlet of said extrusion die (15).

6. Equipment according to claim 5, wherein in the first zone A, said at least one screw (5) has a large forward pitch.

7. Equipment according to claim 5, wherein, in the second zone B, said at least one screw (5) has a forward pitch gradually reducing from upstream to downstream of this zone.

8. Equipment according to claim 7, wherein said at least one screw (5) in the second zone comprises kneading and/or mixing discs and/or at least one screw element of reverse pitch.

9. Equipment according to claim 5, wherein, in the second zone B, the temperature of the mixture is of approximately 140° C.

10. Equipment according to claim 5, wherein, in the third zone C, said at least one screw (5) comprises at least one screw element of reverse pitch or kneading discs.

11. Equipment according to claim 5, wherein, in the fourth zone D, said at least one screw (5) has a large forward pitch and the cylinder (3) comprises at least one orifice (11) for exposure to the air.

12. Equipment according to claim 5, wherein, in the sixth zone F, the rate of shear is at least twice as low as in the third and fourth zones C and D.

13. Equipment according to claim 5, wherein, in the sixth zone F, said at least one screw (5) creates with the internal wall of the cylinder (3) an annular passage or a large free volume for the circulation of the dough-inclusion mixture.

14. Equipment according to claim 5, wherein, at the end of the sixth zone F, the pressure inside the cylinder (3) is of approximately 60 to 100 bar and the temperature of the mixture is kept below 120° C.

15. Equipment according to claim 5, wherein the extrusion die 15 comprises at least one extrusion orifice (16) having a diameter at least equal to 0.5 mm.

16. Equipment according to claim 5, wherein the extruding machine (1) comprises two co-penetrating and co-rotating screws (5).

* * * * *